United States Patent [19]

Cooper et al.

[11] Patent Number: 4,813,171

[45] Date of Patent: Mar. 21, 1989

[54] POWER-OPERATED LATERAL ACTUATOR FOR A FISHING OUTRIGGER

[75] Inventors: Herbert Cooper, 1965 S. Ocean Dr., Hallandale, Fla. 33009; Harry Loomis, Pompano Beach, Fla.

[73] Assignee: Herbert Cooper, Fort Lauderdale, Fla.

[21] Appl. No.: 124,679

[22] Filed: Nov. 24, 1987

[51] Int. Cl.$^4$ ............................................. A01K 97/10
[52] U.S. Cl. ....................................... 43/27.4; 43/21.2
[58] Field of Search ................ 43/21.2, 27.4; 248/652, 248/653, 654

[56] References Cited

U.S. PATENT DOCUMENTS

| | | | |
|---|---|---|---|
| 3,565,372 | 2/1971 | Jones et al. | 248/654 |
| 3,809,343 | 5/1974 | Adams et al. | 248/654 |
| 3,945,701 | 12/1976 | Kelly, Jr. | 248/653 |
| 4,014,127 | 3/1977 | Turner | 43/21.2 |
| 4,232,850 | 11/1980 | Kimber et al. | 248/654 |
| 4,384,542 | 5/1983 | Wilson | 43/274 |

*Primary Examiner*—Kurt Rowan
*Attorney, Agent, or Firm*—Herbert L. Lerner; Laurence A. Greenberg

[57] ABSTRACT

A lateral fishing outrigger has a mast with one end pivotally attached to a side of a boat at a given point and at least one collar disposed in the vicinity of the other end of the mast for guiding fishing lines. A power-operated actuator for the outrigger includes a housing pivotally attached to the side of the boat, a drive disposed in the housing, and a rod connected to the drive and pivotally attached to the other end of the mast for pivoting the mast toward and away from the side of the boat about the given point.

17 Claims, 2 Drawing Sheets

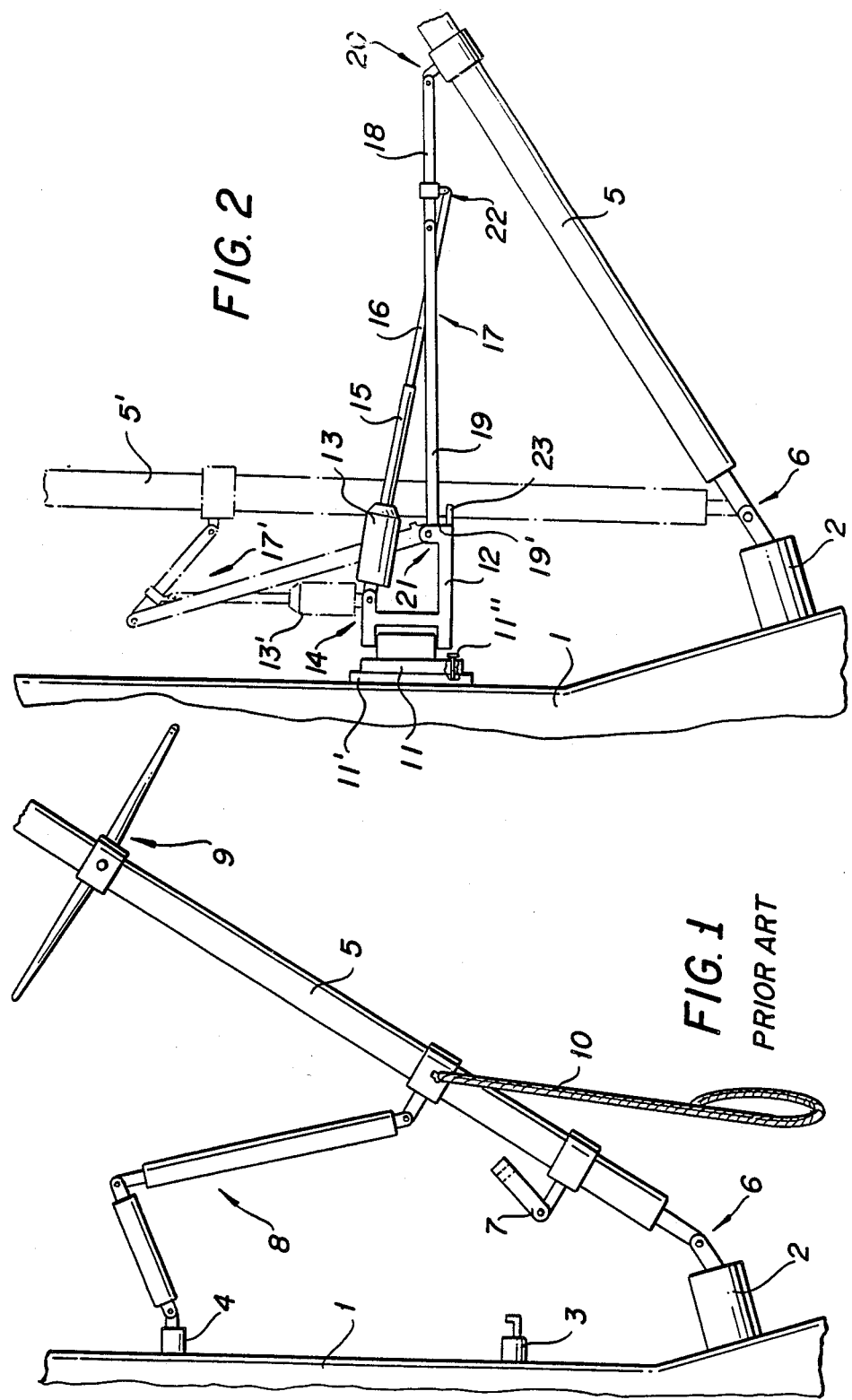

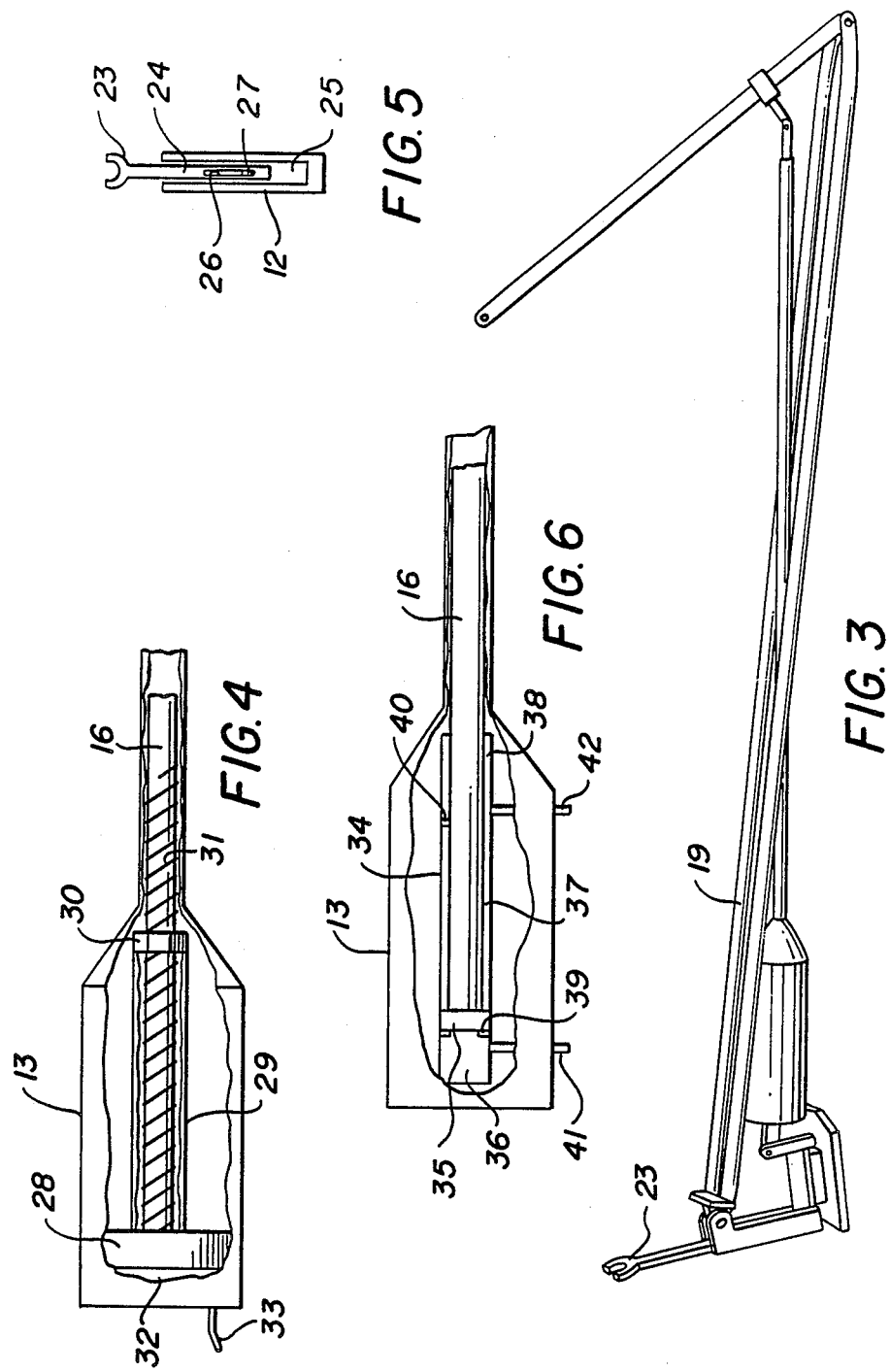

POWER-OPERATED LATERAL ACTUATOR FOR A FISHING OUTRIGGER

The invention relates to an outrigger attached to the side of a boat for guiding and preventing tangling of fishing lines when trolling.

Such devices generally take the form of a mast which has one end pivoted at the side of the boat and at least one star-shaped collar at the other end thereof with cables attached to the points of the stars. Other cables connected to the mast are to be attached to the fishing lines.

As will be further discussed below with the aid of the drawings, such an outrigger is either held against the boat by a catch or is manually extended until held by an arm. A rope is used to retract the outrigger. Such a device is difficult to operate since the boater must reach out of the boat both to extend and to retract the outrigger. The operation may have to be performed often when entering and leaving fishing areas and each time the boater must leave his fishing or steering position to do so. Furthermore, there is no way to secure the outrigger in any position other than the fully extended and fully retracted positions.

Improvements have been made in fishing outriggers in the past. U.S. Pat. No. 4,388,774 discloses a system for extending fishing rods on beams beyond the sides of a boat by means of a winch. British Patent No. 250,518 uses a winch and a line to raise and lower a beam for hauling a whale carcass onto a boat. U.S. Pat. No. 4,376,350 teaches the use of a motor to turn a reel of a fishing rod for automatically lowering the end of a fishing line to a given depth U.S. Pat. No. 1,619,512 discloses a fishing apparatus in which a motor-driven fishing line passes over a trough for fish. U.S. Pat. No. 3,568,352 provides a cam system for automatically "playing" or moving a fishing rod up and down to attract fish Finally, Swiss Patent No. 152,129 deals with a pivotal mast for a folding boat.

The '350 and '512 Patents mentioned above provide motorized systems for directly reeling and unreeling fishing lines, which is not the subject matter of the invention of the instant application and the '129 Patent merely deals with a pivot joint. The other patents mentioned above manipulate fishing rods and other accessories, but not fishing outriggers attached to the side of a boat. Additionally, in these systems the motor drives are external to the equipment being moved, requiring a great deal of space and a portion of the deck. Such space is not available at an outrigger which is attached to the side of the boat and the use of such winch and line systems would complicate rather than simplify the existing manual outrigger control.

It is accordingly an object of the invention to provide a power-operated lateral actuator for a fishing outrigger, which overcomes the hereinafore-mentioned disadvantages of the heretofore-known devices of this general type and which is self-contained, remotely controllable and infinitely adjustable.

With the foregoing and other objects in view there is provided, in accordance with the invention, a power-operated lateral actuator for a fishing outrigger having a mast with one end pivotally attached to a side of a boat at a given point, and at least one collar disposed in the vicinity of the other end of the mast for guiding fishing lines, the actuator comprising a housing pivotally attached to the side of the boat, a drive disposed in the housing, and a rod connected to the drive and pivotally attached to the mast for pivoting the other end of the mast toward and away from the side of the boat about the given point Through the use of the invention of the instant application, a mast can for the first time be moved toward and away from the side of the boat by remote control without reaching out of the boat.

In accordance with another feature of the invention, there is provided a beam connecting the rod to the mast, the beam having two ends and being connected to the rod between the ends, one of the ends of the beam being pivotally connected to the mast and the other of the ends of the beam being pivotally connected to the side of the boat.

In accordance with a further feature of the invention, the beam includes first and second parts pivotally connected to each other, the first part being connected to the mast and to the rod and the second part being connected to the side of the boat.

In accordance with again an added feature of the invention, the second part of the beam has two legs through which the rod passes.

The beam collapses about the pivotal connection between the ends thereof when the mast is raised into the storage position, so that a compact storage is permitted.

In accordance with again an additional feature of the invention, the drive includes means for infinitely adjusting the position of the rod and the mast within a given range.

Due to this feature, a mast of a fishing outrigger can for the first time be placed in any position instead of merely at the fully raised and fully lowered positions as in the prior art.

In accordance with an added feature of the invention, there is provided a bracket pivotally connecting the housing and the beam to the side of the boat.

In accordance with this feature, only one connection need be made to the side of the boat, besides the pivot point of the mast.

In accordance with again another feature of the invention, the bracket is pivotally connected to the side of the boat.

This feature automatically adjusts for the curvature of the hull.

In accordance with an additional feature of the invention, there is provided a stop disposed on the bracket for preventing the mast from striking the bracket, and means for holding the stop at adjustable distances from the bracket.

In this way, it is possible to adjust for differences in the shape and size of the mast as well as in the mounting thereof and the plane of the side of the boat.

In accordance with still another feature of the invention, the drive includes an electric motor having a drive shaft and a nut connected to the drive shaft, the rod having screw threads formed thereon being engaged in the nut for advancing and retracting the rod upon rotation of the drive shaft and the nut.

In accordance with still a further feature of the invention, the drive includes an electric motor connected to the rod and a battery compartment disposed in the housing for receiving a battery operating the motor.

In accordance with still an added feature of the invention, there is provided an electric line protruding from the housing for operating the motor by remote control.

In accordance with again a further feature of the invention, the drive is a pneumatic drive.

In accordance with again an added feature of the invention, the drive is a hydraulic drive.

These drives provide self-contained actuators for the rod which are operable by remote control.

In accordance with again an additional feature of the invention, there are provided pins pivotally attaching the housing to the side of the boat and pivotally attaching the rod to the mast, the pins being removable for removing the housing, the tube and the rod from the mast and from the boat for manual operation of the mast.

In accordance with yet another feature of the invention, there is provided a stop disposed on the beam for contacting the bracket and preventing the beam from pivoting below the horizontal.

In accordance with a concomitant feature of the invention, there is provided a plate mounted on the side of the boat, the bracket including a turntable rotatable on the plate, and a pin passing through holes formed in the turntable and in the plate for securing the turntable to the plate in a plurality of mutually rotated positions. In this way, the outrigger can also be raised and lowered in the plane of the side of the boat, permitting passage under a bridge.

Other features which are considered as characteristic for the invention are set forth in the appended claims.

Although the invention is illustrated and described herein as embodied in a power-operated lateral actuator for a fishing outrigger, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a fragmentary, diagrammatic, side-elevational view of a prior art outrigger;

FIG. 2 is a view similar to FIG. 1 of an outrigger equipped with the power-operated actuator according to the invention;

FIG. 3 is an enlarged perspective view of the power-operated actuator according to FIG. 2;

FIG. 4 is a further enlarged fragmentary and partly broken-away side-elevational view of the drive housing containing an electric motor;

FIG. 5 is bottom-plan view of the actuator showing the adjustable stop; and

FIG. 6 is a view similar to FIG. 4 showing a hydraulic or pneumatic drive in the drive housing.

Referring now to the figures of the drawings in which the relative dimensions of the elements have been somewhat distorted in order to clarify the illustration and first, particularly, to FIG. 1 thereof, there is seen a prior art fishing outrigger attached to the side 1 of a boat. Blocks 2, 3 and 4 are attached to the hull of the boat. A mast 5 which is attached to the block 2 by a pivot point 6 carries at least one star-shaped collar 9 in the vicinity of the end thereof. The pivot point 6 allows the mast to pivot in four directions, namely back and forth horizontally and vertically. The collar 9 guides cables at the points thereof for tensioning the mast. Fishing lines are attached to other cables connected to the mast by clips in order to prevent tangling of the lines. A catch 7 is placed over a hook on the block 3 when the mast is pivoted into a non-illustrated vertical or storage position in order to prevent movement of the mast. An arm 8 attached to the block 4 prevents the mast from pivoting outward beyond a given angle. A rope 10 is provided so that a boater can reach outside the boat in order to pull the mast back from the extended position determined by the length of the arm 8.

It should be noted that the intermediate position of the mast shown in FIG. 1 cannot be maintained. The mast will fall to the fully lowered position permitted by the arm 8 if not retained by the catch 7.

According to the invention of the instant application as shown in FIG. 2, a block 2 is again attached to the side 1 of the boat and a mast 5 is attached to the block 2 by a pivot point 6. A preferably circular block 11 in the form of a turntable is rotatable in a preferably circular concentric plate 11' which is attached to the side 1 of the boat and a bracket 12 is pivotable on the block 11. A pin 11" passes through a hole in the block 11 into one of several holes in the plate 11', as shown in the broken-away portion. When inserted as shown, the pin prevents relative motion of the elements 11 and 11'. However, when the pin 11" is removed, the block 11 can rotate on the plate 11'. Although the blocks 3 and 4 of FIG. 1 are not needed for mounting the device according to the invention, it is clear that the power-operated actuator according to the invention can be added to a boat equipped with such elements so that a boat with the conventional outrigger can be retrofitted.

A housing 13 of a power-operated actuator according to the invention is attached to the bracket 12 by a pivot point 14. The housing 13 includes a tube 15 from which a rod 16 extends.

A beam 17 includes a first part 18 attached to the mast 5 at a pivot point 20 and a second part 19 attached to the bracket 12 at a pivot point 21. Like the pivot point 6, the pivot point 20 also permits pivoting in four directions. The rod 16 is attached to the first part 18 at a pivot point 22. Pins at the pivot points 14 and 22 can be removed so that elements 13, 15 and 16 may also be removed for operating the outrigger manually.

The position of the mast 5 shown in solid lines in FIG. 2 is determined by the length of the rod 16. Although it is not contemplated to lower the mast beyond an angle of approximately 45° with the side of the boat, the mast can be lowered further by simply extending the rod more and even further by lengthening the beam 17. In the illustrated embodiment, a stop 19' extends downward from the second part 19 which contacts the vertical surface of bracket 12 and prevents the beam 17 from pivoting below the horizontal.

FIG. 2 also shows the mast in a retracted position in phantom, in which it is given reference numeral 5'. By simply retracting the rod with the drive in the drive housing 13, the beam 17 is bent into the position 17', the mast is rotated counter-clockwise and the drive housing 13 is moved into the position 13'. In order to lower the mast again, the drive is reversed. It is also noted that the mast may be stopped at any location between the lowered position 5 and the raised position 5' by merely stopping the drive. When the mast 5 is raised into the position 5', it contacts a stop 23.

The bracket 12 can be rotated through 90° by removing the pin 11" and reinserting it after the block 11 has been rotated. The mast can then pivot in a plane parallel to the side of the boat by activating the drive in the housing 13. This is permitted by the pivot points 6, 20 which are fourway pivots.

FIG. 3 shows an enlarged perspective view of the actuator with the rod almost fully retracted. It can be seen from FIG. 3 that the second part 19 of the beam 17 actually includes two legs through which the tube 15 and the rod 16 pass.

FIG. 5 shows the stop 23 at the end of a bar 24 which is slideable in a channel 25 formed in the bracket 12. Screws 26 pass through a slot 27 in the bar 24 and are engaged in threaded holes formed in the bracket 12.

FIG. 4 illustrates a first embodiment of a drive in the drive housing 13. An electric d-c drive motor 28 with a shaft 29 is disposed in the housing 13. A nut 30 fastened to the drive shaft 29 engages screw threads 31 formed on the rod 16. A battery compartment 32 is also disposed in the housing 13 for operating the drive motor 28. Wires 33 emerge from the housing 13 in order to remotely control the motor from inside the boat or to supply current if the motor is run by the boat battery instead of by a battery in the compartment 32. In this way, the drive can be operated from multiple control stations on the boat. It is readily seen that when the drive motor is operated, the rotating shaft and nut will advance or retract the rod 16, depending on the direction of rotation. The motor will lock the rod and consequently the mast in any position they occupy when the motor is stopped.

FIG. 6 illustrates a second embodiment of the drive in the drive housing 13. The housing 13 contains a hydraulic or pneumatic cylinder 34 in which a piston 35 is disposed. The piston 35, which is connected to the rod 16, slides in a chamber 37 defined by stops 39, 40. Other chambers 36, 38 alongside the chamber 37 receive hydraulic fluid, such as oil or compressed air from tubes 41, 42. When fluid or air is fed into the chamber 36 through the tube 41, the piston 35 and thus the rod 16 are forced to the right in FIG. 6 up to the stop 40. When fluid or air is fed to the chamber 38 through the tube 42, the piston 35 and thus the rod 16 are forced to the left in FIG. 6 up to the stop 39. Suitable bleed holes are formed in the cylinder 34 for expelling excess fluid or air.

The piston 35 may frictionally engage the the cylinder 34 so that the piston will remain in any intermediate position between the stops 39 and 40 which it occupies when the fluid or air flow is stopped. A fluid reservoir and pump or an air compressor may be located in the housing or at another location but either system may be operated by remote control from inside the boat.

I claim:

1. Power-operated lateral actuator for a fishing outrigger having a mast with one end pivotally attached to a side of a boat at a given point, and at least one collar disposed in the vicinity of the other end of the mast for guiding fishing lines, the actuator comprising a housing pivotally attached to the side of the boat, a drive disposed in said housing, a rod connected to said drive and pivotally attached to the mast for pivoting other end of the mast toward and away from the side of the boat about the given point, and a beam connecting said rod to the mast, said beam having two ends and being connected to said rod between said ends, one of said ends of said beam being pivotally connected to the mast and the other of said ends of said beam being pivotally connected to the side of the boat.

2. Lateral actuator according to claim 1, wherein said beam includes first and second parts pivotally connected to each other, said first part being connected to the mast and to said rod and said second part being connected to the side of the boat.

3. Lateral actuator according to claim 2, wherein said second part of said beam has two legs through which said rod passes.

4. Lateral actuator according to claim 1, wherein said drive includes means for infinitely adjusting the position of said rod and the mast within a given range.

5. Lateral actuator according to claim 1, including a bracket pivotally connecting said housing and said beam to the side of the boat.

6. Lateral actuator according to claim 5, wherein said bracket is pivotally connected to the side of the boat.

7. Actuator actuator according to claim 5, including a stop disposed on said bracket for preventing the mast from striking said bracket, and means for holding said stop at adjustable distances from said bracket.

8. Lateral actuator according to claim 1, wherein said drive includes an electric motor having a drive shaft and a nut connected to said drive shaft, said rod having screw threads formed thereon being engaged in said nut for advancing and retracting said rod upon rotation of said drive shaft and said nut.

9. Lateral actuator according to claim 1, wherein said drive includes an electric motor connected to said rod and a battery compartment disposed in said housing for receiving a battery operating said motor.

10. Lateral actuator according to claim 8, including an electric line protruding from said housing for operating said motor by remote control.

11. Lateral actuator according to claim 9, including an electric line protruding from said housing for operating said motor by remote control.

12. Lateral actuator according to claim 1, wherein said drive is a pneumatic drive.

13. Lateral actuator according to claim 2, wherein said drive is a hydraulic drive.

14. Power-operated lateral actuator for a fishing outrigger having a mast with one end pivotally attached to a side of a boat at a given point, and at least one collar disposed in the vicinity of the other end of the mast for guiding fishing lines, the actuator comprising a housing pivotally attached to the side of the boat, a drive disposed in said housing, a rod connected to said drive and pivotally attached to the mast for pivoting other end of the mast toward and away from the side of the boat about the given point, and pins pivotally attaching said housing to the side of the boat and pivotally attaching said rod to the mast, said pins being removable for removing said housing, said tube and said rod from the mast and from the boat for manual operation of the mast.

15. Lateral actuator according to claim 5, including a stop disposed on said beam for contacting said bracket and preventing said beam from pivoting below the horizontal.

16. Lateral actuator according to claim 5, including a plate mounted on the side of the boat, said bracket including a turntable rotatable on said plate, and a pin passing through holes formed in said turntable and in said plate for securing said turntable to said plate in a plurality of mutually rotated positions.

17. In combination, a fishing outrigger comprising a mast with one end pivotally attached to a side of a boat at a given point, and at least one collar disposed in the vicinity of the other end of said mast for guiding fishing lines; and a power-operated lateral actuator for said outrigger comprising a housing pivotally attached to the side of the boat, a drive disposed in said housing, a rod connected to said drive and pivotally attached to said mast for pivoting said other end of said mast toward and away from the side of the boat about the given point, and a beam connecting said rod to the mast, said beam having two ends and being connected to said rod between said ends, one of said ends of said beam being pivotally connected to the mast and the other of said ends of said beam being pivotally connected to the side of the boat.

* * * * *